(12) United States Patent
Pate et al.

(10) Patent No.: US 6,905,212 B2
(45) Date of Patent: Jun. 14, 2005

(54) VARYING LIGHT BEAM FOR A DISPLAY SYSTEM

(75) Inventors: Michael A. Pate, Tuscon, AZ (US); Peter Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 10/613,491

(22) Filed: Jul. 2, 2003

(65) Prior Publication Data

US 2005/0001994 A1 Jan. 6, 2005

(51) Int. Cl.[7] ............................................. G03B 21/14
(52) U.S. Cl. .......................... 353/31; 353/84; 348/743
(58) Field of Search ........................... 353/31, 38, 84, 353/97, 98; 349/5, 7; 348/742, 743

(56) References Cited

U.S. PATENT DOCUMENTS

| | | | | |
|---|---|---|---|---|
| 6,467,910 | B1 | | 10/2002 | Sato |
| 6,771,325 | B1 | * | 8/2004 | Dewald et al. ............. 348/743 |
| 2001/0035941 | A1 | * | 11/2001 | Peterson et al. ............. 353/98 |
| 2002/0135862 | A1 | | 9/2002 | Dewald |
| 2003/0020839 | A1 | * | 1/2003 | Dewald ...................... 348/743 |
| 2003/0197834 | A1 | * | 10/2003 | Kang .......................... 353/31 |

* cited by examiner

*Primary Examiner*—William Dowling

(57) ABSTRACT

A method of producing a light beam for a display system includes generating a light beam having a transverse cross section that is elongate along a longitudinal axis, and moving a plurality of beam-modifying optical elements sequentially along a travel path that intersects the light beam with the light beam cross-section longitudinal axis oriented transverse to the travel path.

51 Claims, 2 Drawing Sheets

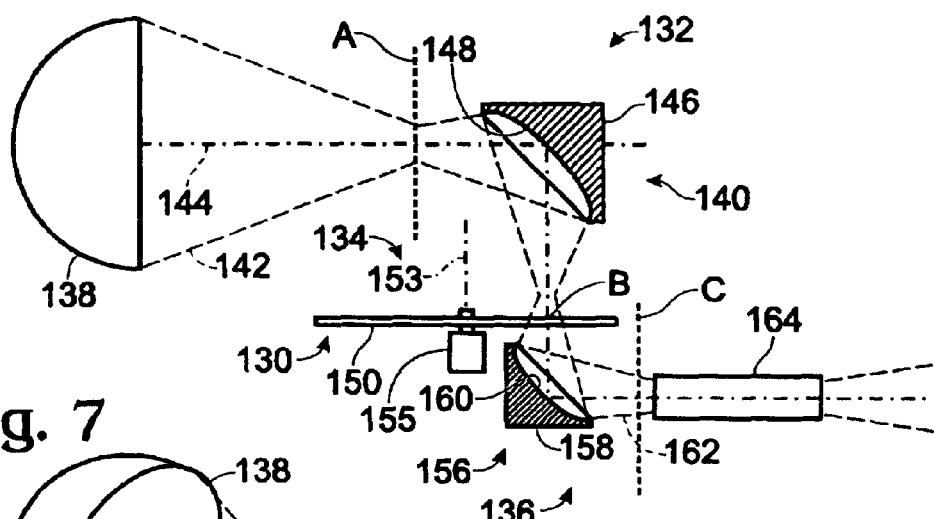
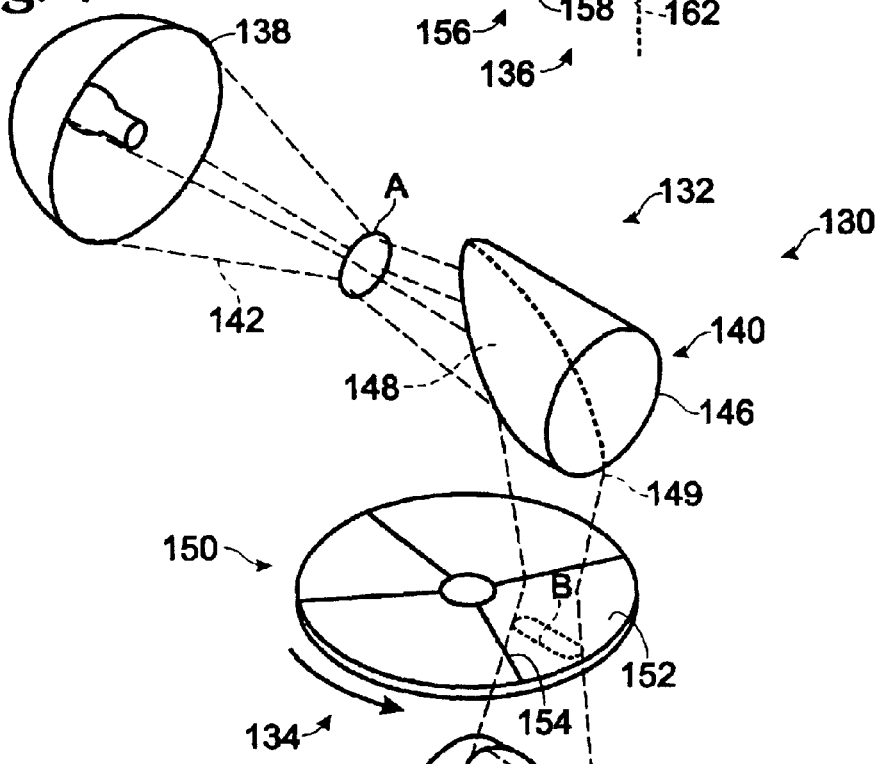
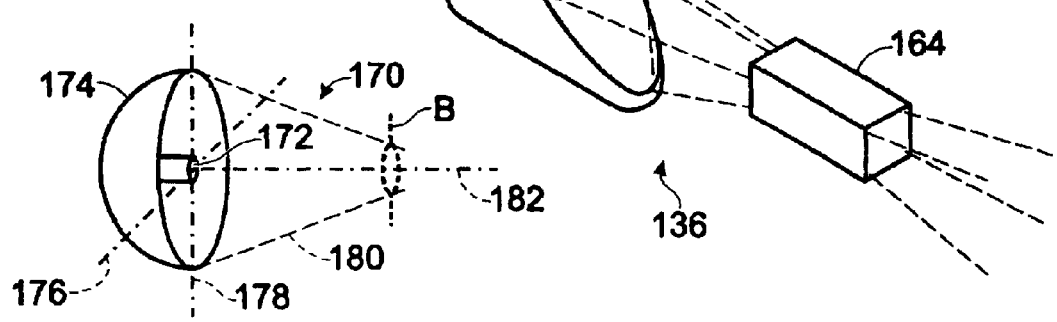

VARYING LIGHT BEAM FOR A DISPLAY SYSTEM

BACKGROUND

Various display systems have been used over the years to generate images. Such display systems may employ image devices, such as cathode ray tubes (CRTs), liquid crystal displays (LCDs), or electrically addressed emissive displays, e.g. plasma displays. The display systems further may incorporate a passive display screen or an active display screen.

Many of today's display systems transmit successive images having differing characteristics, such as different colors. A standard series of colored images associated with a final composite image may be transmitted at a rate that is sufficiently fast that the human eye perceives an image that is a combination of the separately colored images. Such a system may be referred to as a field-sequential display system. One such system includes a light source, a color wheel, and a spatial light modulator. Light generated from the light source in such a display system is directed onto the color wheel, which sequentially filters light from the light source, typically producing red light, green light, blue light, and depending upon the filter, white (unfiltered) light. These colored lights thus typically are sent sequentially to the spatial light modulator, which modulates each of the colored lights as required to achieve the desired image.

Color wheels typically may be planar, cylindrical or conical in shape. Color wheels have transitions between filters, that may be referred to as spokes, that extend normal to the direction of travel of the filters. When a spoke intersects the light beam, this produces a filtered light beam that has two colors. This mixed light is often discarded by the display system, in order to produce colored images that are only one of the three primary colors or white. In one existing projector, the light beam is circular in transverse cross section and occupies a 17-degree arc for each of the four spokes of a rotating color wheel. These four spokes of 17 degrees each add up to 68 degrees, or 18 percent, of the available 360 degrees of time-averaged light that may be wasted.

SUMMARY

A method of producing a light beam for a display system includes generating a light beam having a transverse cross section that is elongate along a longitudinal axis, and moving a plurality of beam-modifying optical elements sequentially along a travel path that intersects the light beam with the light-beam cross-section longitudinal axis oriented transverse to the travel path.

BRIEF DESCRIPTION OF THE DRAWINGS

FIG. 6 is a schematic view of a device configured to produce a varying light beam according to yet another embodiment of the invention.

FIG. 7 is a simplified isometric view of the device of FIG. 6.

FIG. 8 illustrates a light source usable in a display system or light-beam generator according an aspect of the invention.

DETAILED DESCRIPTION

Figure 1:
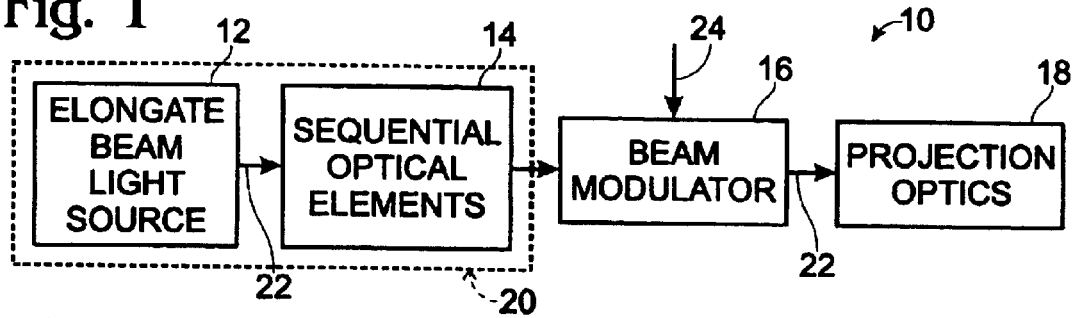
FIG. 1 is a block diagram of a display system according to an embodiment of the invention.

Referring initially to FIG. 1, a display system according to an embodiment of the present invention is shown generally at 10. Display system 10 may be any suitable system adapted to display sequential different images, including, but not limited to, rear-projection display systems and front-projection display systems. Display system 10 may include an elongate-beam light-source device 12, a sequential optical-element apparatus 14, a beam modulator 16, and projection optics 18.

Light source device 12 and sequential optical-element apparatus 14 form a varying light-beam generator 20. Light-source device 12 may be any illumination source that produces a light beam that is elongate in transverse cross section and directs the light beam along a light path 22. Optical-element apparatus 14 may be configured to move, sequentially, optical elements into the light path so that the light beam has varying characteristics, such as varying colors or polarization. The optical elements may move along a travel path that intersects the light path with the light-beam cross-section longitudinal axis oriented transverse to the travel path.

The spatial light modulator may modulate the varying light beam to produce images based on received image information 24, such as video or still image data. The spatial light modulator may be a digital micro-mirror array, LCoS (liquid crystal on silicon), LCD array, interference based modulator array, diffractive based modulator array, or similar device. The image of the spatial light modulator may then be projected by the projection optics along light path 22 for viewing sequentially varied images. Projection optics 18 may include one or more projection lenses, reflectors, or other optical elements for focusing the image stream on a viewing surface, such as a screen (not shown).

Figure 2:
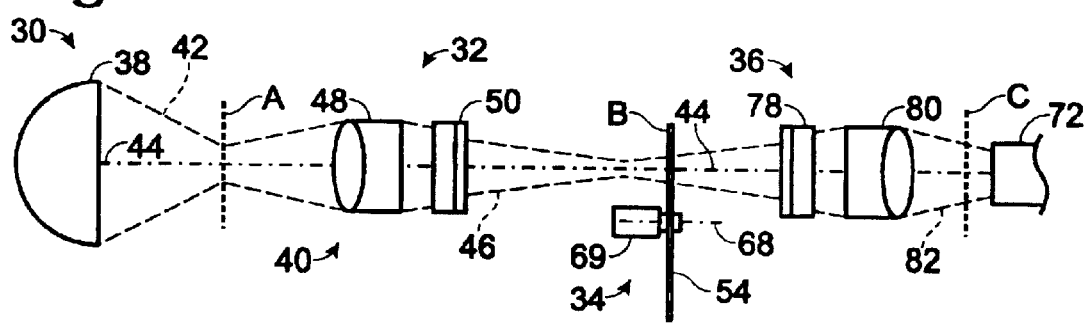
FIG. 2 is a schematic view of a device configured to produce a varying light beam according to another embodiment of the invention.

FIG. 2 illustrates a light beam generator 30 that may be used in a display system, such as system 10, according to an aspect of the invention. Generator 30 may include an elongate-beam light-source device 32, a sequential optical-element apparatus 34, and, optionally, a further beam conditioner 36. Light-source device 32 may include a light source 38 and an anamorphic optical device 40. Light source 38 may be any suitable means for directing light along a light path, including a broad-spectrum light source, a full spectrum light source, or a white light source. Selected appropriate light sources may include, among others, metal halide lamps, xenon lamps, halogen lamps, mercury vapor lamps, plasma lamps, and incandescent lamps. The light sources also may include single or multiple solid-state sources that are optically combined to a common optical aperture and optical axis for projection.

Figure 4:
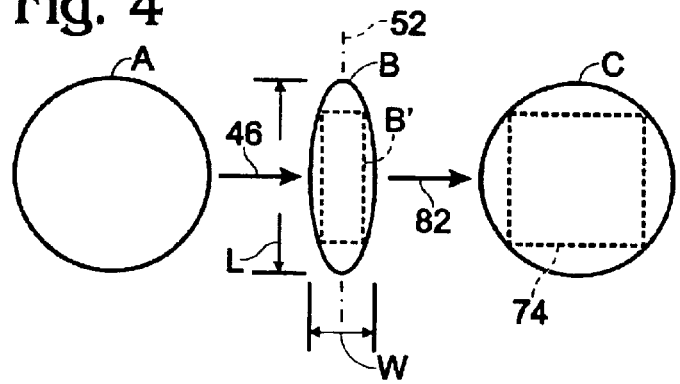
FIG. 4 is an illustration of transformations in a beam of light that may be according to the device of FIG. 2.

Light source 38 may produce a light beam 42 on a light path 44 that has a particular configuration relative to a longitudinal axis of a transverse cross section. For example, a common light beam may have a generally circumferentially uniform transverse cross section, such as a circular cross section. Using this example, then, light beam 42 may have a generally circular cross section A, as is illustrated in FIG. 4. As is commonly known, a circle has a constant diameter in all directions. The light beam may have other shapes, such as regular polygons, that provide generally uniform dimensions at circumferentially spaced locations, or may have other configurations characterized by a shape relative to a longitudinal axis of the light beam, as is described further below.

Anamorphic optical device 40 may be any optical device that has or produces different optical magnification along mutually perpendicular radii, and thereby modifies light beam 42 to form a light beam 46 that has reduced relative width transverse to a longitudinal axis of a transverse cross section of the light beam, as represented by elongate cross section B, illustrated in FIG. 4. This may also be expressed as having increased relative elongation along the longitudinal axis. Various shapes may be provided. For instance, a line, slit or slot shape, as represented generally as cross section B', may be provided., As discussed below, if a light beam is produced by a light source that is elongate transverse to a longitudinal axis, it may be modified so that it is less elongate transverse to the optical axis, such as by reducing the relative dimension of the light beam transverse to the longitudinal axis or increasing the relative dimension of the light beam along the longitudinal axis.

Optical device 40 may include lenses, such as an optical relay 48 and a cylindrical lens 50. Other combinations of optical elements, whether refractive, diffractive or reflective, may be used that provide for modification of the light beam 42 into a light beam 46 that is relatively elongate along a longitudinal axis 52 extending in the plane of the view of FIG. 2. Thus, optical device 40 may transform or reorient a light beam 42 to one that is elongate along a longitudinal axis oriented in a plane transverse to the plane of FIG. 2. The line shape of the illumination may also be produced by the light source reflector 38, to produce the elongate light beam, as is illustrated in FIG. 8, discussed below.

Although light beam cross section B is shown in FIG. 4 as having the same general dimension L along longitudinal axis 52 as light-beam cross section A, the actual dimension of cross section B may be more or less than the cross section A. These cross section representations are for illustration. A significant comparison is represented when one considers that the cross section A may correspond to the area of intersection of a light beam with a color filter were the light beam is not modified by anamorphic device 40. By modifying the light beam to have the transverse cross section B, the width of the light beam is in effect reduced from width L, corresponding to the diameter of the light beam cross section A, to a width W, corresponding to the width of elongate light-beam cross section B.

Figure 3:
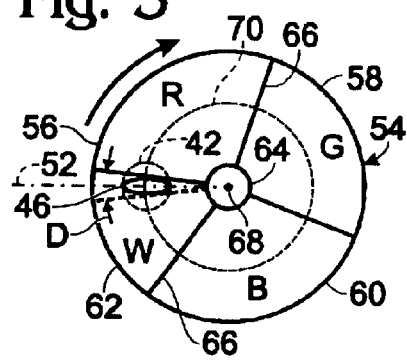
FIG. 3 is a generalized plan view of a color wheel usable in the device of FIG. 2.

Sequential optical element apparatus 34 may be in the form of a planar filter wheel or color wheel 54. Other color filter configurations may also be used, such as cylindrical or conical forms, and reflective as well as transmissive filter forms. A side or plan view of color wheel 54 is illustrated in FIG. 3. Color wheel 54 may include a plurality of beam-modifying optical elements in the form of filter regions or filters, including a red filter 56, a green filter 58, a blue filter 60, and a white filter or transparent element 62. Other filter combinations may be used, such as more or fewer of the same colors or different relative sizes of the different colors. For instance the color wheel may not have a white filter. These filters are mounted to a hub 64 and are separated by transitions at adjoining edges, referred to as transition regions or spokes 66. The color wheel may rotate about an axis of rotation 68 driven by a driver 69, such as a motor. Accordingly, the filters may be said to travel along a travel path 70. The color wheel in combination with the light source device functions as a sequential color generator. The filters may be formed as moveable plates or films, or even transparent containers of filtering fluid, that selectively filter light as it passes through the filters. Reflective filters may also be used.

Color wheel 54 and light source device 32 may be configured so that longitudinal axis 52 of elongate light beam 46 intersects the color wheel at an orientation that is transverse to travel path 70 of the filter elements. In particular, longitudinal axis 52 and spokes 66 are configured so that axis 52 is generally aligned with spokes 66, and may be normal to travel path 70. With this alignment, it is seen that light beam 46, having a width W shown in FIG. 4, illuminates a region of the color wheel that occupies an arc or angle D of the color wheel. As the color wheel rotates, transition periods occur in which spokes pass through the light beam. The spokes travel through arc D during these transitions. Since the light that travels along light path 44 after passing through the color wheel, has mixed colors resulting from the light beam passing through two filters, this light is not typically used to produce a projected image. By putting a line or other shape of reduced-width illumination through the filter wheel, the 17 angular degrees of illumination otherwise lost at each spoke with a circular light beam, may be substantially reduced, putting more time-averaged light on the screen.

Other orientations of the light beam relative to the travel axis may also be used. The thinner the elongate light beam, represented by dimension W illustrated in FIG. 4, along the travel path, the less the transition period, represented by rotational dimension D illustrated in FIG. 3, may be between adjacent filters.

As a comparison, the outline of light beam 42 is also illustrated in FIG. 3. It is seen that an arc of transition wider than dimension D, may be required for a circular light beam having a diameter about the same as the length L of the elongate dimension of light beam 46. The thinner the elongate light beam is in a dimension parallel to the travel path of the filters, the less of a transition arc, or dimension D, is produced, and the more time-averaged light there is that is available to produce an image on the screen. The length L of the elongate light beam may be selected based on the dimensions and characteristics of the filters. For example, a light beam that is focused to be too narrow or too small may result in a light beam that has a high enough flux density to impair or damage the optical characteristics of the filter. By increasing the length along the longitudinal axis, the flux may be distributed, and the flux density may be reduced.

After passing through the color filters, light beam 46 optionally may enter what is generally referred to as light beam conditioner 36. Conditioner 36 is intended to relate to optics that may be used to modify and control the light beam before it impinges the light beam modulator. The use of light beam conditioning depends on a particular display system design. In the embodiment shown in FIG. 2, an integrating rod 72 may integrate the light beam as a waveguide having an exit aperture generally conforming to the configuration of the spatial light modulator. For instance, the integrating rod may have a rectangular cross section, as indicated at 74 in FIG. 4. In order to direct the light relatively evenly in the inlet of the integrating rod, a second anamorphic optical device 36 may modify the light beam to conform to the shape of the inlet of the optical waveguide. Optical device 36 may include a cylindrical lens 78 followed by a relay lens 80. The resulting re-modified light beam 82 may have a generally circumferentially uniform cross section and have reduced elongation, such as a circular cross section C, as shown in FIG. 4. This shape may distribute the light beam in the integrating rod more evenly than would light beam 46.

Figure 5:
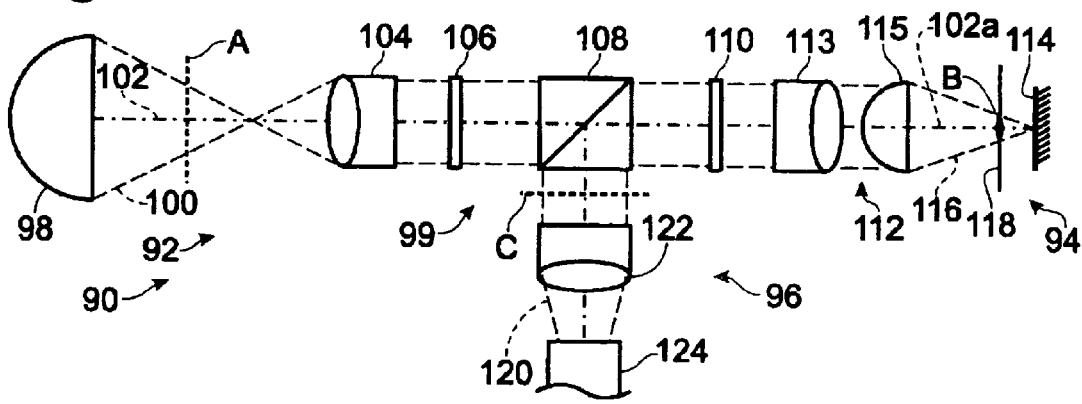
FIG. 5 is a schematic view of a device configured to produce a varying light beam according to another embodiment of the invention.

Referring now to FIG. 5, another embodiment is illustrated as a light beam generator 90. Generator 90 may include an elongate light-beam light-source device 92, a sequential optical-element apparatus 94 and a light beam conditioner 96. Light source device 92 may include a light source 98 and an anamorphic device 99. Light source 98 may be similar to light source 38 to produce a light beam, such as a light beam 100 having a generally circular transverse cross section A, and directed along a light path 102.

Anamorphic device 99 may include a doublet, collimating lens 104 followed by a linear polarizer 106, a polarizing light-beam splitter 108, a quarter-wavelength plate 110, an anamorphic objective lens 112, and a plane mirror 114. Anamorphic objective lens 112 may include an objective lens 113 and a cylindrical lens 115. The portion 102a of light path 102 between the light-beam splitter and the plane mirror may be bidirectional. That is the light beam output from light source 98 travels along light path 102 from the light source through the light-beam splitter and other in-line optical devices to the mirror. This portion of the light beam may be referred to as an incident light beam. A reflected light beam then may travel back along the same path but in the opposite direction until it enters the light-beam splitter and is diverted from the bi-directional light path section 102a along a diverted light path. The use of a bi-directional light path allows the use of a single anamorphic objective lens.

Linear polarizer 106 may polarize the light beam and quarter-wavelength plate 110 may then convert the polarization from linear to right-hand circular. Anamorphic objective lens 112 may then convert the polarized light beam into an elongate light beam 116 having an elongate transverse cross section B. Elongate light beam 116 may then pass through optical element apparatus 94 in the form of a color wheel 118. As was described for color wheel 54, color wheel 118 is rotated about an axis parallel to light path 102a by a motor, such as motor 69, not shown in FIG. 5. As described for light beam generator 30, the elongate light beam may be oriented so that the elongate longitudinal axis is aligned with radial spokes on the color wheel.

The light passing through the color wheel may be reflected back along light path 102a by mirror 114. This reflection may be achieved with various mirror configurations, including a corner cube mirror or a corner V-shaped mirror. The reflected light beam may then pass through the anamorphic objective lens in the reverse direction, modifying the elongate light beam back to a circular light beam 120 having a circular cross section C. The polarized reflected circular light beam may return through quarter-wavelength plate 110 and be diverted from the bidirectional light-path portion 102a toward optional beam conditioner 96 by polarized-light beam splitter 108, also referred to as a diverter. Beam conditioner 96 may contain a condensing lens 122 and an integrating rod 124.

Referring now to FIGS. 6 and 7, yet another embodiment is illustrated as a light-beam generator 130. Generator 130 may include an elongate-beam light-source device 132, a sequential optical-element apparatus 134 and a beam conditioner 136. Light-source device 132 may include a light source 138 and an anamorphic device 140. Light source 138 may be similar to light source 38 and produce a light beam 142, having a generally circular transverse cross section A, directed along a light path 144.

Anamorphic device 140 may be in the form of a reflector 146 having a surface 148 curved, such as with a modified cylindrical curve, to provide focusing of an elongate light beam 149 having an elongate cross section B on optical element apparatus 134. As with the other embodiments, optical element apparatus 134 may be in the form of a rotating color wheel 150 having a plurality of color filters, such as filter 152, with the filters separated by radially extending spokes, such as spoke 154, defining adjacent edges of adjacent filters. Color wheel 150 may be rotated about an axis 153 by a motor 155. Again, elongate light beam 149 may be aligned with the spokes as the spokes pass through the light beam, as has been described.

Beam conditioner 136, if appropriate, may include an anamorphic optical device 156 in the form of a reflector 158 having an anamorphic elliptical surface 160 configured to convert the elongate light beam into a generally circular light beam 162 having a circular cross section C. The circular light beam may be directed into an integrating rod 164.

In the embodiments described above with reference to FIGS. 3–7, the elongate-beam light-source devices may include a light source having a circular light beam followed by an anamorphic optical device that converts the circular light beam into an elongate light beam. An alternative embodiment may be a light source that directly produces what is referred to as an elongate light beam, which is a light beam having a transverse cross section that is elongate along a longitudinal axis. As an example, FIG. 8 illustrates an elongate light-beam light-source 170 having an illumination element 172, such as an arc or filament that may produce light illuminating a reflector 174. Reflector 174 may have a non-uniform curvature, such as a combination of elliptical curvatures along orthogonal axes, such as a horizontal axis 176 and a vertical axis 178. Light source 170 may directly produce an elongate light beam 180 along a light path 182 having an elongate cross section B. This light beam may then be directed directly at a sequential optical-element apparatus, such as a color wheel, as described above.

It is seen that embodiments are illustrated that may provide a light beam having a transverse cross section that is elongate along a longitudinal axis. The light beam may be directed along a light path that may be intersected sequentially by a plurality of beam-modifying optical elements traveling along a travel path. The longitudinal axis of the light beam may be oriented transverse to the traveling path and may be in alignment with adjacent edges of the optical elements. Alternatively, a light beam may be modified to have a reduced width along the travel path. This may produce a light beam that varies with the movement of the optical elements through the light beam. The light beam, accordingly, may have transitions between optical elements of reduced width.

It is believed that the disclosure set forth above encompasses multiple distinct embodiments of the invention. While each of these embodiments has been disclosed in specific form, the specific embodiments thereof as disclosed and illustrated herein are not to be considered in a limiting sense as numerous variations are possible. The subject matter of this disclosure thus includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A method of producing a beam of light for a display system comprising:

generating a light beam having a tranverse cross section taken in a plane generally perpendicular to a light path of the light beam, the transverse cross section being elongate along a longitudinal axis; and moving a plurality of beam-modifying optical elements sequentially along a travel path that intersects the light path with the longitudinal axis of the transverse cross section of the light beam oriented transverse to the travel path.

2. The method of claim 1, where moving a plurality of optical elements includes moving differently colored filters.

3. The method of claim 1, where moving a plurality of optical elements includes separating sequentially adjacent optical elements along transition regions extending transverse to the travel path.

4. The method of claim 3, where moving a plurality of beam-modifying optical elements includes moving a plurality of beam-modifying optical elements sequentially along a travel path that intersects the light path with the longitudinal axis of the transverse cross section of the light beam generally aligned with the transition regions.

5. A method of producing a beam of light for a display system comprising:

generating a light beam having a generally circular transverse cross section and modifying the light beam having a generally circular transverse cross section to have a transverse cross section that is elongate along a longitudinal axis; and moving a plurality of beam-modifying optical elements sequentially along a travel path that intersects the light path with the longitudinal axle of the transverse cross section of the light beam oriented transverse to the travel path.

6. The method of claim 5, where modifying the light beam includes at least one of reflecting the light beam off of an anamorphic surface and transmitting the light beam through anamorphic lenses.

7. The method of claim 5, further comprising reflecting the light beam having an elongate transverse cross section back along a portion of the light path.

8. The method of claim 7, further comprising polarizing the light beam, and diverting the reflected polarized light beam from the portion of the light path.

9. The method of claim 8, further comprising, modifying the reflected polarized light beam having an elongate transverse cross section in a manner decreasing the elongation of the transverse cross section of the light beam.

10. A method of producing a beam of light for a display system comprising:

generating a light beam having a transverse cross section that is elongate along a longitudinal axis;

moving a plurality of beam-modifying optical elements sequently along a travel path that intersects the light path with the longitudinal axis of the transverse cross section of the light beam oriented transverse to the travel path; and modifying the light beam in the light path, downstream from the intersection of the light path and travel path, in a manner decreasing the elongation of the transverse cross section of the light beam.

11. The method of claim 10, where modifying the light beam includes at least one of reflecting the light beam off of an anamorphic surface and transmitting the light through an anamorphic lens.

12. The method of claim 10, further comprising reflecting the light beam having an elongate transverse cross section back along a portion of the light path.

13. The method of claim 12, further comprising polarizing the light beam, and diverting the reflected polarized light beam from the portion of the light path.

14. A light path comprising:

a light source device configured to produce a light beam having a transverse cross section taken in a plane generally perpendicular to a light path of the light beam, the transverse cross section being elongate along a longitudinal axis; and a plurality of beam-modifying optical elements configured to move sequentially along a travel path that intersects the light beam with the longitudinal axis of the transverse cross section of the light beam, transverse to the travel path.

15. The light path of claim 14, where the optical elements include differently colored filters.

16. The light path of claim 14, where the optical elements include sequentially adjacent optical elements that are separated by a transition region extending transverse to the travel path, and the longitudinal axis of the transverse cross section of the light beam is generally aligned with the transition region as the transition region passes through the light beam.

17. A light path comprising:

a light source device including a light source configured to produce a light beam having a generally circular transverse cross section, and a first anamorphic optical device configured to modify the light beam having a generally circular transverse cross section to have a transverse cross section that is elongate along the longitudinal axis; and a plurality of beam-moving optical elements configured to move sequentially along a travel path that intersects the light beam with the longitudinal axis of the transverse cross section of the light beam, transverse to the travel path.

18. The light path of claim 17, where the anamorphic optical device includes at least one of a reflector and a lens.

19. The light path of claim 17, where the light beam travels along a light path, and further comprising a reflector configured to reflect the light beam having an elongate transverse cross section back along a portion of the light path.

20. The light path of claim 19, further comprising a polarizer configured to polarize the light beam, and a diverter configured to divert the reflected polarized light beam from the portion of the light path.

21. The light path of claim 20, where the anamorphic optical device is positioned in the portion of the light path, whereby the reflected light is modified to have a transverse cross section that has increased circumferential uniformity.

22. A light path comprising:

a light source device configured to produce a light beam having a transverse cross section that is elongate along a longitudinal axis;

a plurality of beam-modifying optical elements configured to move sequentially along a travel path that intersects the light beam with the longitudinal axis of the transverse cross section of the light beam, transverse to the travel path; and an anamorphic optical device configured to modify the light beam downstream from the intersection of the light path and the travel path, to have a transverse cross section that has decreased elongation.

23. The light path of claim 22, where the anamorphic optical device includes at least one of a reflector and a lens.

24. A generator of a varying light beam for a display system comprising:

a light source device configured to produce a light beam directed along a light path, the light beam having a transverse cross section taken in a plane generally perpendicular to a light path of the light beam, the transverse cross section being elongate along a longitudinal axis; and a plurality of beam-modifying optical elements configured to move sequentially along a travel path that intersects the light path with the longitudinal axis of the transverse cross section of the light beam, transverse to the travel path.

25. The generator of claim 24, where the optical elements are colored filters.

26. A generator of a varying light beam for a display system comprising:

a light source device including a light source configured to produce a light beam having a generally circular transverse cross section, and a first anamorphic optical device configured to modify the light beam having a generally circular transverse cross section to have a transverse cross section that is elongate along the longitudinal; axis a plurality of beam-modifying optical elements configured to move sequentially along a travel path that intersects the light path with the longitudinal axis of the transverse cross section of the light beam, transverse to the travel path.

27. The generator of claim 26, where the anamorphic optical device includes at least one of a reflector and a lens.

28. The generator of claim 26, further comprising a reflector configured to reflect the light beam having an elongate transverse cross section back along a portion of the light path.

29. The generator of claim 28, further comprising a polarizer configured to polarize the light beam, and a diverter configured to divert the reflected polarized light beam from the portion of the light path.

30. The generator of claim 29, where the anamorphic optical device is positioned in the portion of the light path, whereby the reflected light is modified to have a transverse cross section that has increased circumferential uniformity.

31. A generator of a varying light beam for a display system comprising:

a light source device configured to produce a light beam directed along a light path, the light beam having a transverse cross section that is elongate along a longitudinal axis;

a plurality of beam-modifying optical elements configured to move sequentially along a travel path that intersects the light path with the longitudinal axis of the transverse cross section of the light beam, transverse to the travel path; and an anamorphic optical device configured to modify the light beam in the light path downstream from the intersection of the light path and the travel path, to have a transverse cross section that has decreased elongation.

32. The generator of claim 31, where the anamorphic optical device includes at least one of a reflector and a lens.

33. A display system comprising:

a light source device configured to produce a light beam directed along a light path having a transverse cross section taken in a plane generally perpendicular to a light path of the light beam, the transverse cross section being elongate along a longitudinal axis;

a plurality of beam-modifying optical elements configured to move sequentially along a travel path that intersects the light path with the longitudinal axis of the transverse cross section of the light beam transverse to the travel path;

a spatial light modulator for modulating the light of sequentially different colors according to received image information; and projection optics for directing the modulated light beam along the light path.

34. The display system of claim 24, where the optical elements are colored filters.

35. A display system comprising:

a light source device including a light source configured to produce a light beam having a generally circular transverse cross section, and a first anamorphic optical device configured to modify the light beam having a generally circular transverse cross section to have a transverse cross section that is elongate along the longitudinal axis;

a plurality of beam-modifying optical elements configured to move sequentially along a travel path that intersects the light path with the longitudinal axis of the transverse cross section of the light beam transverse to the travel path;

a spartial light modulator for modulating the light of sequentially different colors according to received image information; and projection optics for directing the modulated light beam along the light path.

36. The display system of claim 35, where the anamorphic optical device includes at least one of a reflector and a lens.

37. The display system of claim 35, further comprising a reflector configured to reflect the light beam having an elongate transverse cross section back along a portion of the light path.

38. The display system of claim 37, further comprising a polarizer configured to polarize the light beam, and a diverter configured to divert the reflected polarized light beam from the portion of the light path.

39. The display system of claim 38, where the anamorphic optical device is positioned in the portion of the light path, whereby the reflected light is modified to have a transverse cross section that has decreased elongation.

40. A display system comprising:

a light source device configured to produce a light beam directed along a light path having a transverse cross section that is elongate along a longitudinal axis;

a plurality of beam-modifying optical elements configured to move sequentially along a travel path that intersects the light path with the longitudinal axis of the transverse cross section of the light beam transverse to the travel path;

a spatial light modulator for modulating the light of sequentially different colors according to received image information;

projection optics for directing the modulated light beam along the light path; and an anamorphic optical device configured to modify the light beam in the light path downstream from the intersection of the light path and the travel path, to have a transverse cross section that has decreased elongation.

41. The display system of claim 40, where the anamorphic optical device includes at least one of a reflector and a lens.

42. A display system comprising:

a light source configured to produce a light beam having a generally circular transverse cross section;

a first anamorphic optical device configured to modify the light beam having a generally circular transverse cross section to have a transverse cross section that is elongate along a longitudinal axis;

a filter assembly having a plurality of differently colored filters, a support for supporting the plurality of differently colored filters adjacent to each other, the filter assembly being configured to move the plurality of differently colored filters sequentially along a travel path that intersects the light path with the longitudinal axis of the transverse cross section of the light beam transverse to the travel path, sequentially adjacent filters having adjacent edges that are generally aligned with the longitudinal axis of the transverse cross section of the light beam, when the adjacent edges are impinged by the light beam, the filter assembly producing a light beam of sequentially different colors;

a light integrating rod having an aperture of a first configuration;

a second anamorphic optical device configured to modify the light beam in the light path between the filter assembly and the light integrating rod, to have a transverse cross section that more closely corresponds to the first configuration than does the light beam with a transverse cross section that is elongate along a longitudinal axis;

a spatial light modulator for modulating the light of sequentially different colors according to received image information; and projection optics for directing the modulated light beam along the light path.

43. The display system of claim 42, where the filter assembly includes a color wheel having the filters arranged circumferentially.

44. The display system of claim 43, where the filters travel in a plane of rotation with the filter edges extending radially, and the longitudinal axis of the transverse cross section of the light beam extends along a radius of the color wheel.

45. Means for producing a time-varying light beam for a display system comprising:

means for generating a light beam having a transverse cross section that is elongate along a longitudinal axis;

a plurality of means for modifying the light beam; and means for moving the plurality of means for modifying the light beam sequentially along a travel path that intersects the light path with the longitudinal axis of the transverse cross section of the light beam oriented transverse to the travel path.

46. The means for producing a time-varying light beam of claim 45, where the means for modifying the light beam includes means for filtering different colors from the light beam.

47. The means for producing a time-varying light beam of claim 45, where the means for moving the plurality of means for modifying the light beam is further for separating sequentially adjacent means for modifying the light beam along transition regions extending transverse to the travel path.

48. The means for producing a time-varying light beam of claim 47, where the means for moving the plurality of means for modifying the light beam is further for moving the transition regions through the light beam with the transition regions generally aligned with the longitudinal axis of the light beam.

49. The means for producing a time-varying light beam of claim 45, where the means for generating a light beam is further for generating a light beam having a generally circular transverse cross section and for modifying the light beam having a generally circular transverse cross section to have a transverse cross section that is elongate along the longitudinal axis.

50. A method of producing a beam of light for a display system comprising:

generating a light beam having a given transverse cross section taken at a first angle relative to a light path of the light beam;

modifying the light beam to have a modified transverse cross section taken at the first angle relative to the light path of the light beam, the modified transverse cross section having a reduced width transverse to a longitudinal axis relative to a length along the longitudinal axes; and moving a plurality of beam-modifying optical elements sequentially along a travel path that intersects the modified light beam with the longitudinal axis of the modified transverse cross section oriented transverse to the travel path.

51. A generator of a varying light beam for a display system comprising:

a light source configured to produce a light beam having a given transverse cross section;

a first anamorphic optical device configured to modify the light beam having a generally circular transverse cross section to have a transverse cross section that has a reduced width transverse to a longitudinal axis relative to a length along the longitudinal aids; and a plurality of beam-modifying optical elements configured to move sequentially along a travel path that intersects the modified light beam with the longitudinal axis of the transverse cross section of the modified light beam, transverse to the travel path.

* * * * *

UNITED STATES PATENT AND TRADEMARK OFFICE
CERTIFICATE OF CORRECTION

PATENT NO. : 6,905,212 B2
DATED : June 14, 2005
INVENTOR(S) : Pate et al.

It is certified that error appears in the above-identified patent and that said Letters Patent is hereby corrected as shown below:

Column 12,
Line 46, delete "aids;" and insert -- axis; --.

Signed and Sealed this

Tenth Day of January, 2006

JON W. DUDAS
*Director of the United States Patent and Trademark Office*